(12) United States Patent
Chaudhary et al.

(10) Patent No.: US 10,356,611 B2
(45) Date of Patent: Jul. 16, 2019

(54) SYSTEMS AND METHODS FOR PROVIDING A USER WITH INSTANT ACCESS TO WEB SERVICES

(71) Applicant: Verizon Patent and Licensing Inc., Arlington, VA (US)

(72) Inventors: Tushar Chaudhary, San Francisco, CA (US); Gaurav Gupta, San Jose, CA (US); Guanqun Bao, Sunnyvale, CA (US); Devin Blong, Penngrove, CA (US); Manish Sharma, San Jose, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1168 days.

(21) Appl. No.: 14/586,559

(22) Filed: Dec. 30, 2014

(65) Prior Publication Data
US 2016/0192108 A1   Jun. 30, 2016

(51) Int. Cl.
*G06F 8/61* (2018.01)
*H04W 12/06* (2009.01)
(Continued)

(52) U.S. Cl.
CPC .............. *H04W 12/06* (2013.01); *G06F 8/61* (2013.01); *H04M 3/5166* (2013.01); *H04W 4/60* (2018.02); *H04W 12/08* (2013.01); *H04M 3/493* (2013.01); *H04M 3/5191* (2013.01); *H04M 2203/6081* (2013.01)

(58) Field of Classification Search
None
See application file for complete search history.

(56) References Cited

U.S. PATENT DOCUMENTS

| 8,645,014 B1* | 2/2014 | Kozlowski | H04W 4/70 701/24 |
| 8,843,847 B1* | 9/2014 | Boyle | G06F 9/451 715/781 |

(Continued)

OTHER PUBLICATIONS

Medhi et al. "Designing mobile interfaces for novice and low-literacy users." ACM Transactions on Computer-Human Interaction (TOCHI) 18.1 (2011): 2 Retrieved on [Mar. 15, 2019] Retrieved from the Internet: URL<https://dl.acm.org/citation.cfm?id=1959024> (Year: 2011).*

(Continued)

*Primary Examiner* — Thuy Dao
*Assistant Examiner* — Cheneca Smith

(57) ABSTRACT

A server device may communicate with a user device by engaging in a telephone call with the user device, by providing a webpage to the user device, or in another way. The user device may communicate a request to the server device for a particular web service, such as a mapping service, a banking service, technical support, customer service, etc., and the server device may communicate the request to an instant access device that may cause the user device to instantly access the web service, whether by automatically downloading and installing a mobile application with the web service or by automatically accessing a web page. In some implementations, the instant access device may authenticate the user device in order to provide the user device with access to the web server.

20 Claims, 20 Drawing Sheets

(51) Int. Cl.
    *G06F 21/44*     (2013.01)
    *H04W 12/08*     (2009.01)
    *H04W 4/60*     (2018.01)
    *H04M 3/51*     (2006.01)
    *H04M 3/493*     (2006.01)

(56) References Cited

U.S. PATENT DOCUMENTS

| | | | |
|---|---|---|---|
| 9,143,884 B2 * | 9/2015 | Madhavapeddi | H04W 4/00 |
| 9,420,103 B1 * | 8/2016 | Varman | H04W 4/12 |
| 2006/0206709 A1 * | 9/2006 | Labrou | G06Q 20/18 |
| | | | 713/167 |
| 2007/0123223 A1 * | 5/2007 | Letourneau | H04M 3/42161 |
| | | | 455/414.1 |
| 2009/0163188 A1 * | 6/2009 | Hiller | H04M 3/4938 |
| | | | 455/414.3 |
| 2010/0134299 A1 * | 6/2010 | Fitzgerald | G06F 21/88 |
| | | | 340/573.1 |
| 2014/0134988 A1 * | 5/2014 | Madhavapeddi | H04W 4/00 |
| | | | 455/415 |

OTHER PUBLICATIONS

Banerjee et al. "Mobile banking and payment system using bluetooth media." International Journal of Video & Image Processing and Network Security IJVIPNS-IJENS. vol. 11. No. 05. 2011. Retrieved on [Mar. 15, 2019] Retrieved from the Internet: URL<http://citeseerx.ist.psu.edu> (Year: 2011).*

* cited by examiner

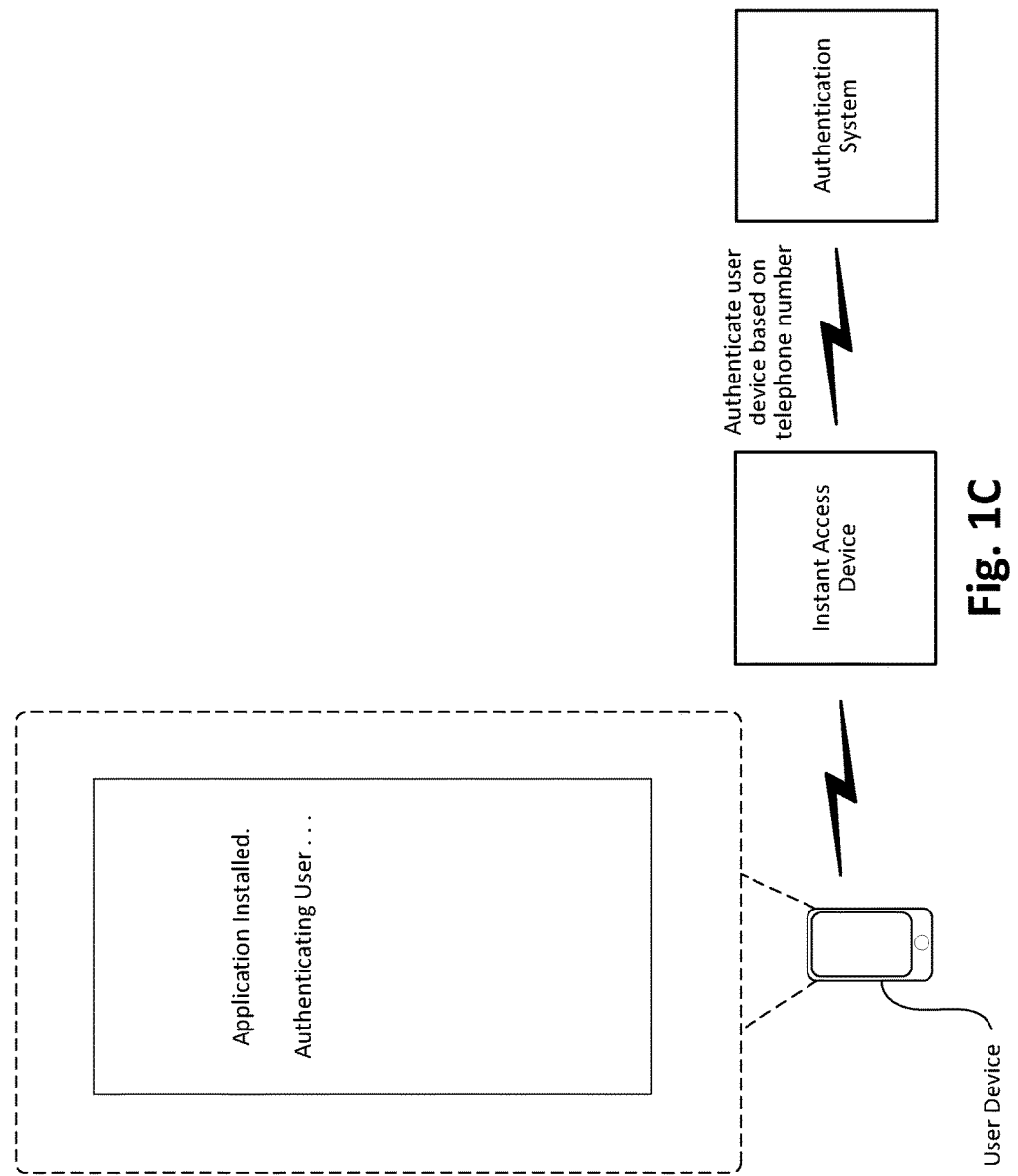

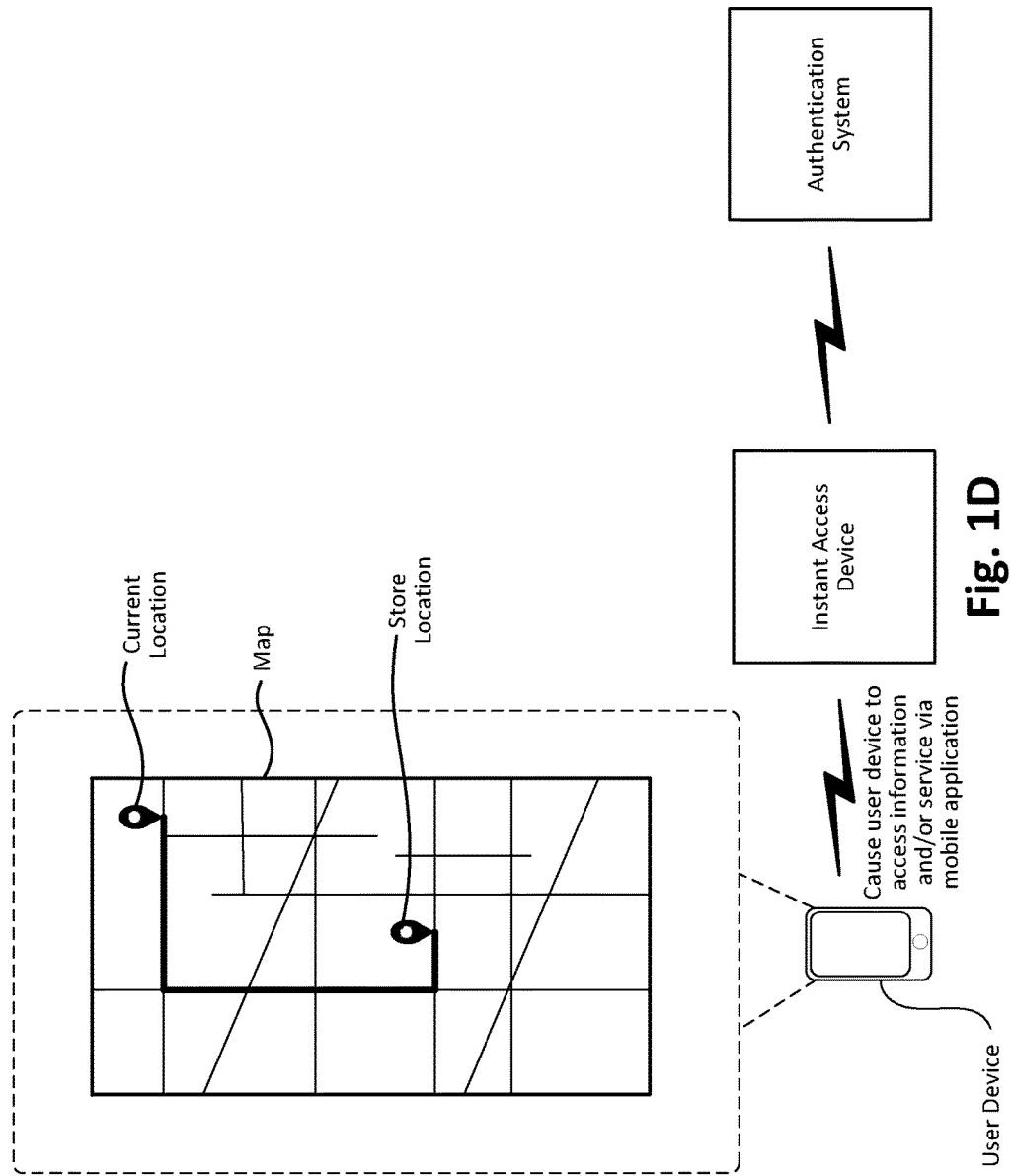

| Pre-selected Codes | Web Service |
|---|---|
| 1234 | Download/install mobile application |
| 2345 | Open website |
| 3456 | Send address for mapping |
| 4567 | Send SMS response number |
| 5678 | Send location to customer service |
| ... | ... |

Fig. 8

SYSTEMS AND METHODS FOR PROVIDING A USER WITH INSTANT ACCESS TO WEB SERVICES

BACKGROUND

Smartphones, tablet computers, and other types of user devices are capable of providing a user with access to a variety of web services (e.g., information, banking services, customer support services, product ordering services, technical support, etc.) by calling an interactive voice response (IVR) system of an organization, downloading and installing a mobile application, or using a browser to view a webpage.

BRIEF DESCRIPTION OF THE DRAWINGS

FIGS. 1A-1D illustrate an example overview of an implementation described herein;

FIG. 8 illustrates example pre-selected codes that may be used to instantly access a web services during a telephone call between an IVR system and a user device.

DETAILED DESCRIPTION OF THE PREFERRED EMBODIMENTS

The following detailed description refers to the accompanying drawings. The same reference numbers in different drawings may identify the same or similar elements.

As mentioned above, currently available networking technologies can enable a user to access web services via a user device. However, currently available solutions for providing users with web services include certain limitations. For example, if a user calls an IVR system or accesses a webpage of an organization in search of a service that is also available via a mobile application, the IVR system or webpage can inform the user that the service is available via the mobile application, but the user must either continue with the telephone call or manually download, install, and navigate through the mobile application in order to obtain the sought-after service. In another example, the IVR system or website can inform the user that the service is available via a particular webpage, but the user must either continue with the telephone call or manually open a browser and type the webpage address in order to obtain the service. Moreover, accessing a mobile application or a webpage can often require the user to remember and manually enter authentication information (e.g., a username and password), thereby further complicating the process of obtaining the sought-after web service.

Systems and/or methods, as described herein, may provide techniques for providing a user with instant access to a web service. While communicating with a server device (e.g., calling an IVR system, browsing a webpage hosted by a web server, etc.), a user device (e.g., a smartphone, a tablet computer, etc.) may request a particular web service from the server device, and an instant access device may cause the user device to automatically access the web service (e.g., may cause the user device to download, install, and access a mobile application with the web service; to navigate to and access a webpage with the web service, etc.). In some implementations, the instant access device may cause the user device to be automatically authenticated in order to access the web service, thereby streamlining the authentication process and enhancing the user's experience.

Figure 1A:
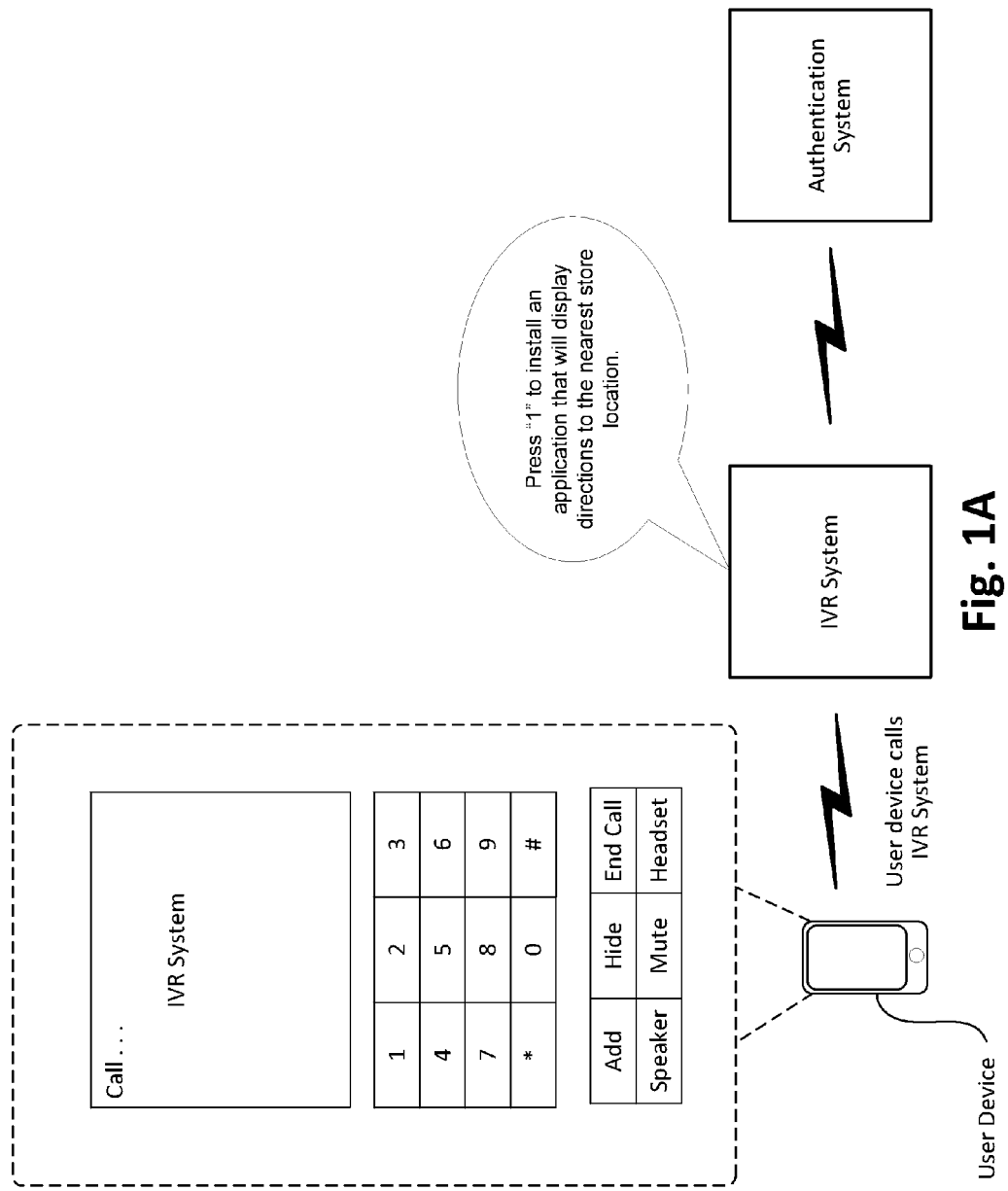
Figure 1B:
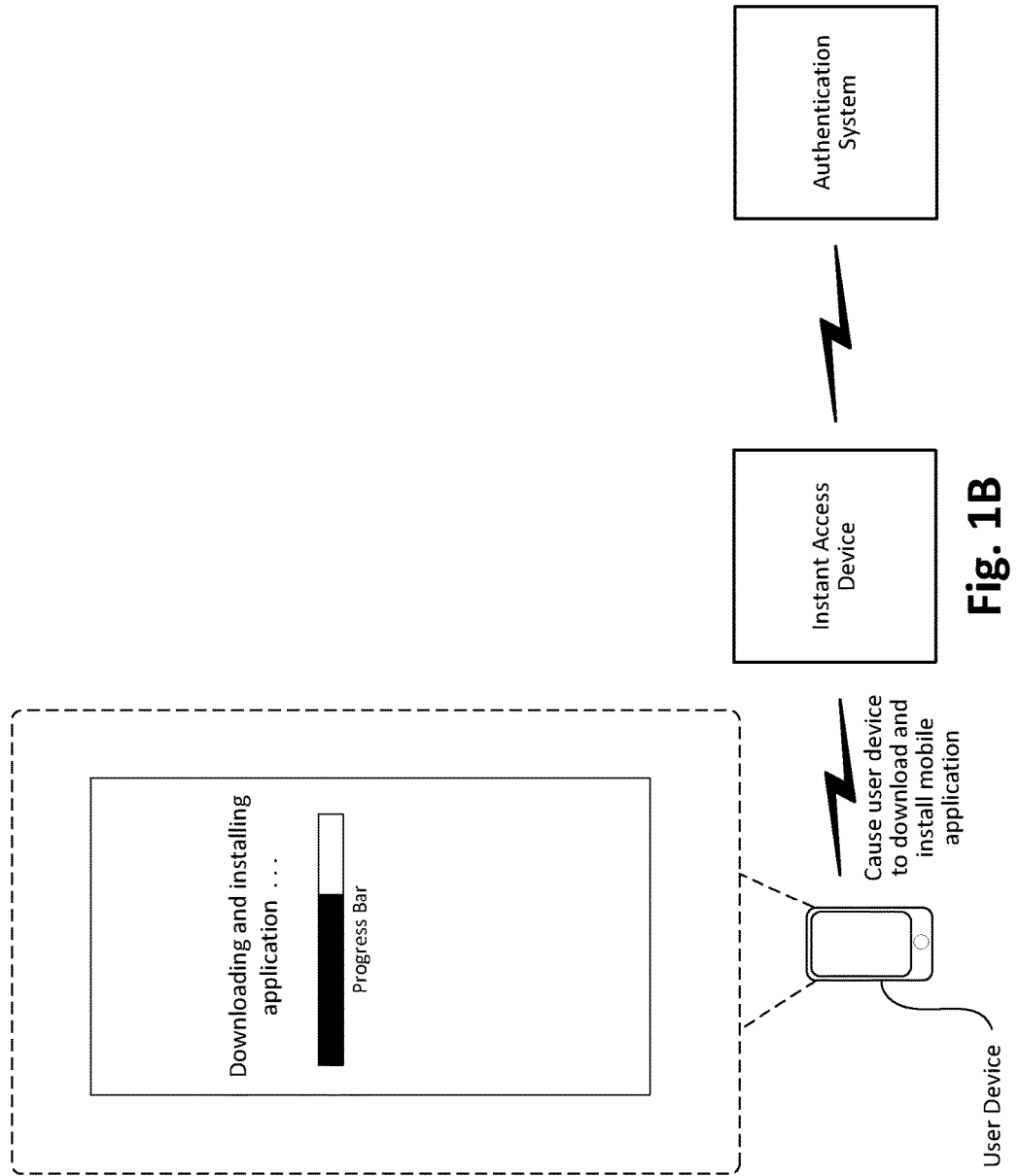

FIGS. 1A-1D illustrate an example overview of an implementation described herein. As shown in FIG. 1A, a user device may call an IVR system to obtain some type of information or service, such as a location of a store near the geographical location of the user device, and the IVR system may provide an offer to the user device to access the information or service via a mobile application (e.g., "Press "1" to install an application that will display directions to the nearest store location."). The user device may accept the offer from the IVR system (e.g., by the user pressing "1"), and an instant access device may cause the user device to automatically download and install the mobile application, as shown in FIG. 1B. For instance, as described herein, the user device may include an instant application client that receives an instruction from the instant access device and retrieves the application via a network, such as the Internet.

As shown in FIG. 1C, in cases where the user device must be authenticated prior to accessing the web service, the instant access device may authenticate the user device by communicating with an authentication system associated with the mobile application. For instance, the instant access device may communicate a telephone number of the user device to the authentication system in order to demonstrate the identity of the user to the authentication system, and the authentication system may respond by granting access to the web service. The instant access device may also, or alternatively, cause the user device to access the web service within the mobile application. For instance, in the case where the user wants to know the location of a store nearest to the user, the instant access device may cause the user device to display a location and/or route to the store within the mobile application, as shown in FIG. 1D. Accordingly, the instant access device may provide the user device with instant access to one or more web services.

As will be discussed in greater detail below, in some implementations, the IVR system may indicate to the user that the web service is available via a webpage (e.g., instead of, or in addition to, the mobile application), and the instant access device may assist the user device in accessing and logging into the webpage in order to access the web service. Further, in some implementations, the user device may be browsing a webpage hosted by a web server, and the user may select a link (or another type of interface object) that indicates the availability of a particular web service via a mobile application. In some such implementations, the instant access device may cause the user device to automatically download, install, and access the web service via the mobile application, in a manner that is similar to that described above with respect to FIGS. 1A-1D.

Figure 2:
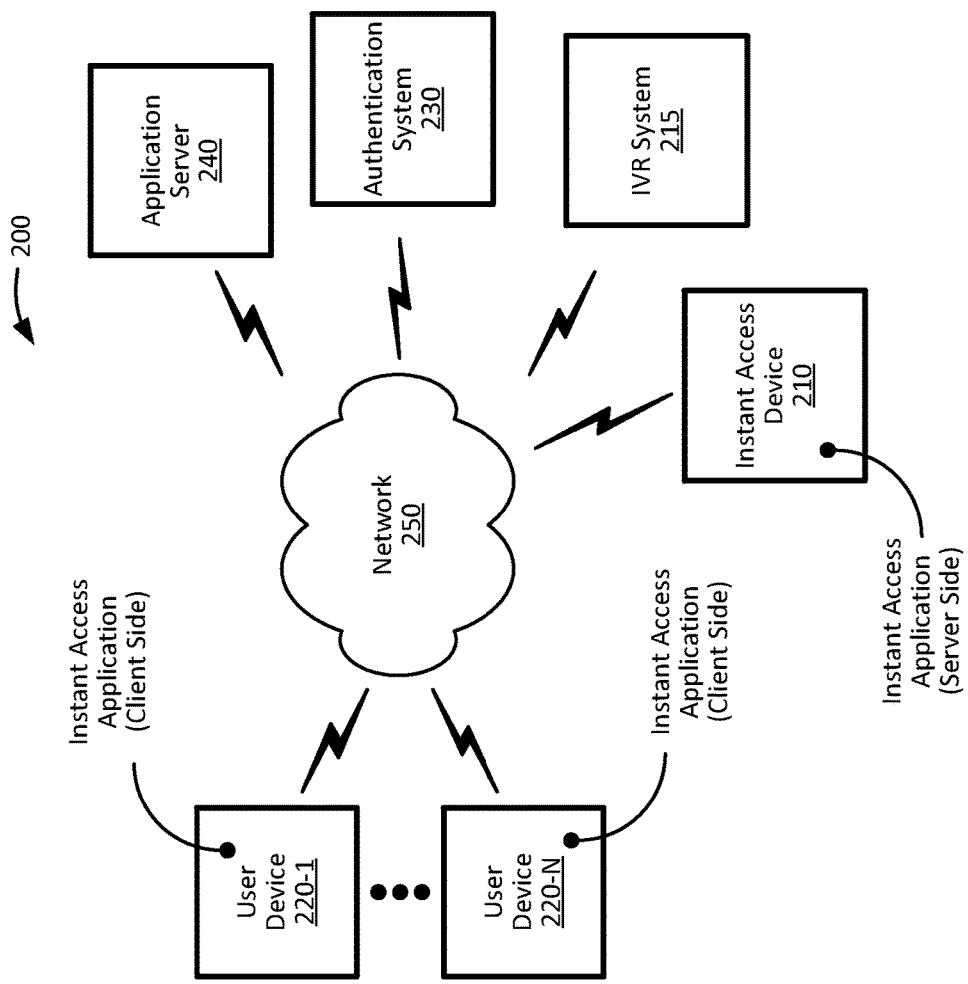
FIG. 2 illustrates an example environment in which systems and/or methods, described herein, may be implemented.

FIG. 2 illustrates an example environment in which systems and/or methods, described herein, may be implemented. As shown in FIG. 2, environment 200 may include instant access device 210, IVR system 215, user devices 220-1 through 220-N (where N is an integer greater than or equal to 1), authentication system 230, application server 240, and network 250.

Instant access device 210 may include one or more computing devices, such as a single server device or a collection of server devices. Instant access device 210 may be connected to, or incorporated within, IVR system 215 (which may include one or more server devices capable of communicating with user device 220 via a telephone call, which may include sending and/or receiving audio signals to and from user device 220). In some implementations, IVR system 215 may also, or alternatively, function as a web server capable of hosting one or more webpages that are accessible by user device 220 via a browser. As such, while instant access device 210 and IVR system 215 are presented in FIG. 2 as two distinct machines, depictions and/or descriptions of instant access device 210, IVR system 215, and/or web servers presented herein may be refer to an implementation where instant access device 210 is incorporated within IVR system 215 and/or the web server.

Instant access device 210 may include a server-side version of an instant access application that may enable instant access device 210 to cause user device 220 to automatically download and install a mobile application, authenticate user device 220 with respect to the mobile application by communicating with authentication system 230, and/or enable user device 220 to instantly access one or more web services via the mobile application (which may involve communicating with application server 240). In some implementations, instant access device 210 may include another type of network device other than, or in addition to, IVR system 215, and/or a web server. For instance, in some implementations, instant access device 210 may include authentication system 230, application server 240, and/or another type of network device.

User device 220 may include a device capable of communicating via a network, such as network 250. For example, user device 220 may include one or more computing devices, such as a smartphone, laptop computer, a desktop computer, a table computer, etc. User device 220 may include a client-side version of the instant access application, which may enable user device 220 to receive information from sever device 210 to determine whether a particular mobile application is already installed on user device 220, download (e.g., from application server 240) and install a mobile application specified by instant access device 210, access a particular feature of a mobile application (e.g., by communicating with application server 240), and/or perform one or more other functions described herein. In some implementations, the instant access application installed on user device 220 may include a background application capable of running without modifying a display of user device 220 and/or requiring an input from a user of user device 220. User device 220 and instant access device 210 may implement an application programming interface (API), through which user device 220 may communicate (e.g., through which instant access device 210 can send instructions according to the API, based on which user device 220 can act (e.g., install a mobile application, display content, access a webpage, etc.)). Additionally, or alternatively, the client-side version of the instant access application may be installed as part of firmware and/or read-only memory (ROM), by a manufacturer and/or vendor of user device 220, and/or may be installed by an end user.

Authentication system 230 may include one or more computing devices, such as a server device or a collection of server devices. Authentication system 230 may be capable of communicating with instant access device 210 to authenticate user device 220 for a particular web service, such as a mobile application, a website, etc. In some implementations, authentication system 230 may authenticate user device 220 based on a telephone number or another type of identifier corresponding to user device 220. For example, instant access device 210 may communicate a telephone number of user device 220 to authentication system 230, and authentication system 230 may query a database of user information (e.g., a name, a street address, a username, a password, etc.) associated with the telephone number in order to identify and authenticate the user of user device 220. In other implementations, one or more other types of authentication operations may be performed in order to authenticate a user of user device 220 for a particular web service. Accordingly, instant access device 210 may alleviate from the user the need to remember a username and/or password corresponding to the mobile application or other type of web service.

Application server 240 may include one or more computing devices, such as a server device or a collection of server devices. Application server 240 may include a repository of mobile applications, from which user device 220 may download a mobile application. Application server 240 may, in some implementations, be associated with an "app store," via which users can typically browse, purchase, and/or download applications. Additionally, or alternatively, application server 240 may operate as an application server for one or more applications installed on user device 220. For instance, user device 220 may download and install a mobile application directed to mapping services from application server 240, and application server 240 may provide one or more types of mapping services to the mobile application installed on user device 220.

Network 250 may include one or more wired and/or wireless networks. For example, network 250 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 250 may include a local area network (LAN), a wireless LAN (WLAN), a wide area network (WAN), a metropolitan network (MAN), the Public Switched Telephone Network (PSTN), an ad hoc network, a managed Internet Protocol (IP) network, a virtual private network (VPN), an intranet, the Internet, a fiber optic-based network, and/or a combination of these or other types of networks.

The quantity of devices and/or networks in environment 200 is not limited to what is shown in FIG. 2. In practice, environment 200 may include additional devices and/or networks, fewer devices and/or networks, different devices and/or networks, or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
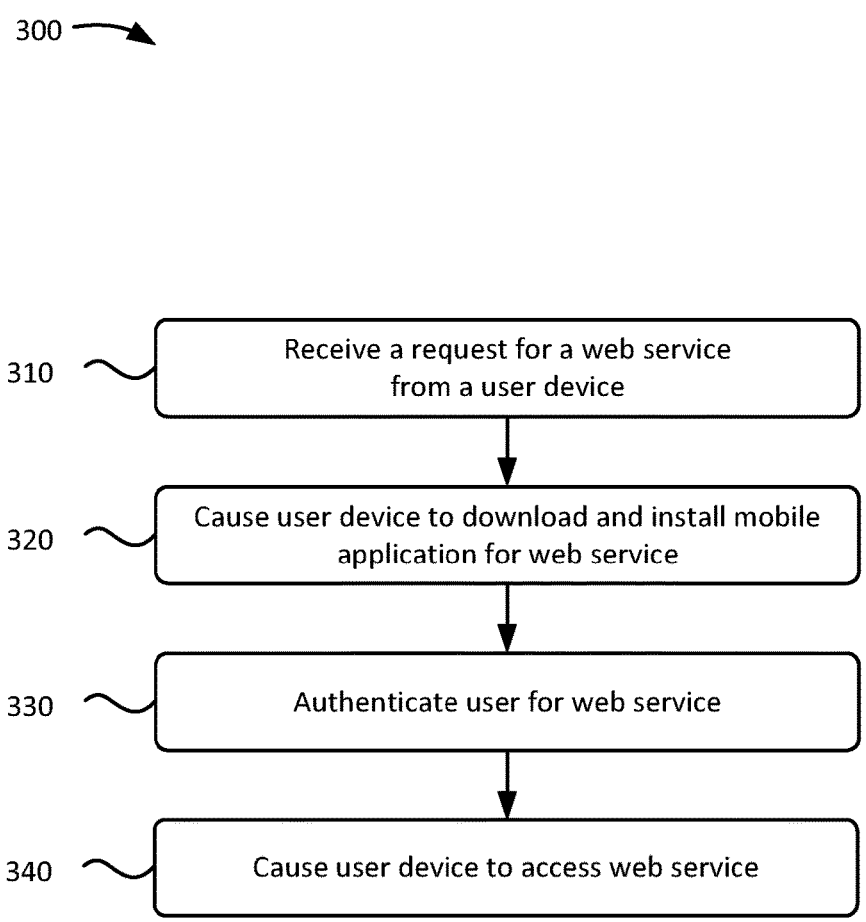
FIG. 3 illustrates a flowchart of an example process for instantly providing a web service to a user.

FIG. 3 illustrates a flowchart of an example process 300 for instantly providing a web service to a user. In some implementations, process 300 may be performed by instant access device 210 (e.g., by an instant access application). In some implementations, some or all of the blocks of process 300 may be performed by one or more other devices.

As show, process 300 may include receiving a request for a web service from a user device (block 310). For example, instant access device 210 may receive a request for a web service from user device 220. In implementations where instant access device 210 and IVR system 215 are separate devices, the request for the web service may be received by instant access device 210 from IVR system 215. In some implementations, the telephone call may be terminated by IVR system 215 in response to receiving the request for the web service from user device 220. In other implementations, IVR system 215 may terminate the telephone call at another point in time, such as after instant access device 210 has verified that user device 220 has downloaded and installed the mobile application, accessed a particular webpage, etc. In implementations wherein instant access device 210 also operates as an IVR system), the request for the web service may include a particular input from a user of user device 220 during a telephone call. In some implementations, the request for the web service may include a user clicking on a link or advertisement on a webpage, in a mobile application, or other type of electronic interface.

Process 300 may include causing user device 220 to download and install a mobile application for a web service (block 320). For example, instant access device 210 may cause user device 220 to automatically download and install a mobile application for a web service. For instance, a server-side version of an instant access application, installed on instant access device 210, may communicate with a client-side version of the instant access application, installed on user device 220, and instruct the client-side version of the instant access application to download and install the mobile application corresponding to a web service requested by a user of user device 220. In some implementations, instant access device 210 may provide the mobile application to user device 220. In other implementations, instant access device 210 may provide instructions and/or information to user device 220 about downloading the mobile application (e.g., from application server 240). In some implementations, instant access device 210 may determine whether user device 220 has already installed the mobile application prior to causing user device 220 to download and install the mobile application to, for example, ensure that user device 220 does not download and/or install the mobile application unnecessarily.

Process 300 may include authenticating a user for the web service (block 330). For example, instant access device 210 may authenticate a user of user device 220 for the web service (requested at block 310). In some implementations, instant access device 210 may authenticate a user for the web service based on a telephone number or another type of unique identifier associated with user device 220. Additionally, or alternatively, instant access device 210 may authenticate the user by communicating with another device, such as authentication system 230 and/or application server 240. For example, instant access device 210 may obtain a telephone number (or another type of unique identifier) for user device 220 and communicate the telephone number to authentication system 230. In turn, authentication system 230 may ascertain authentication information for the user based on the telephone number and proceed by authenticating the user for the web service. In some implementations, instant access device 210 may perform authentication locally by, for example, identifying and processing authentication information of the user based on a telephone number of user device 220. In some implementations, instant access device 210 may obtain the telephone number of user device 220 at or near the beginning of the telephone call, using one or more types of caller identification technologies. Additionally, or alternatively, instant access device 210 may obtain the telephone number of user device 220 by requesting that the user input the telephone number manually.

In some implementations, user device 220 may be authenticated by IVR system 215 prior to downloading a mobile application via instant access system 210. For instance, user device 220 may call IVR system 215 of a banking organization and enter identification/authentication information (e.g., a personal identification number (PIN)) prior to requesting a web service via a mobile application. In such instances, IVR system 215 may communicate with authentication system 230 to authenticate user device 220, and then, at some point after user device 220 has requested the web service via a mobile application, communicate to instant access system 210 that user device 220 is authenticated, such that user device 220 may instantly access the web service upon downloading and installing the mobile application.

Process 300 may include causing the user device to access the web service (block 340). For example, instant access device 210 may cause user device 220 to access the web service (requested at block 310). In some implementations, instant access device 210 may cause user device 220 to access the web service by communicating one or more types of information and/or instructions to user device 220. The information and/or instructions may include an interface page within a mobile application or a webpage address associated with web services requested by user device 220 (at block 310). Additionally, or alternatively, instant access device 210 may communicate with application server 240 in order to cause user device 220 to access the web service. For example, instant access device 210 may communicate with application server 240 in order to identify a feature or interface page within the mobile application associated with the web service requested by user device 220. In such implementations, information and/or instructions communicated from instant access device 210 to user device 220 may include information received from application server 240.

The operations described above with respective to FIG. 3 may include one or more functions or interactions between the server-side version of the instant access application on instant access device 210 and the client-side version of the instant access application on user device 220. For example, the server-side version of the instant access application may communicate directly (or indirectly (e.g., via a third-party messaging service) to determine whether a mobile application is already installed on user device 220, to cause user device 220 to automatically download and/or install a mobile application or to access web service in another way (such as accessing a particular webpage), and/or to interact with user device 220 in another way.

While FIG. 3 shows a flowchart diagram of an example process 300 for instantly providing a web service to a user, in other implementations, a process for instantly providing a web service to a user may include fewer operations, different operations, differently arranged operations, and/or additional operations than depicted in FIG. 3.

Figure 4A:
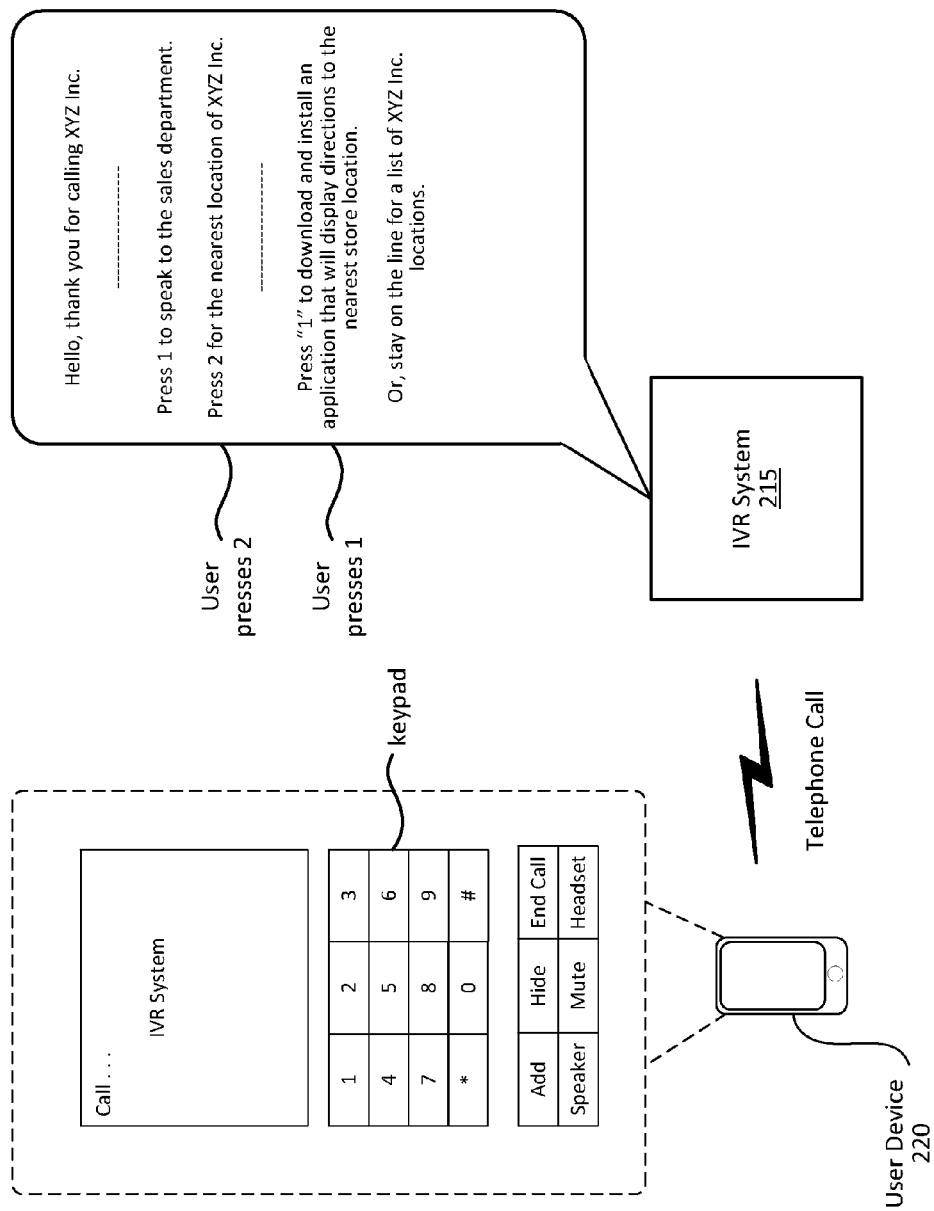
FIGS. 4A-4E illustrate an example implementation for instantly accessing a mobile application with a user device from a telephone call.

FIGS. 4A-4E illustrate an example implementation for instantly accessing a mobile application with user device 210 from a telephone call. As shown in FIG. 4A, user device 220 may engage in a telephone call with IVR system 215. IVR system 215 may provide a dialog welcoming user device 220 to the telephone call (e.g., "Hello, thank you for calling XYZ Inc."). Additionally, or alternatively, IVR system 215 may provide a menu of options to user device 220, such as "Press 1 to speak to the sales department," "Press 2 for the nearest location of XYZ Inc.," etc. In the example shown in FIG. 4A, assume that the user of user device selects "2" (from the keyboard of user device 220) for the nearest location of XYZ Inc., and IVR system 215 responds by providing a menu of options for XYZ Inc. locations, such as "Press "1" to download and install an application that will display directions to the nearest store location," "Stay on the line for a list of XYZ Inc. locations," etc.

Figure 4C:
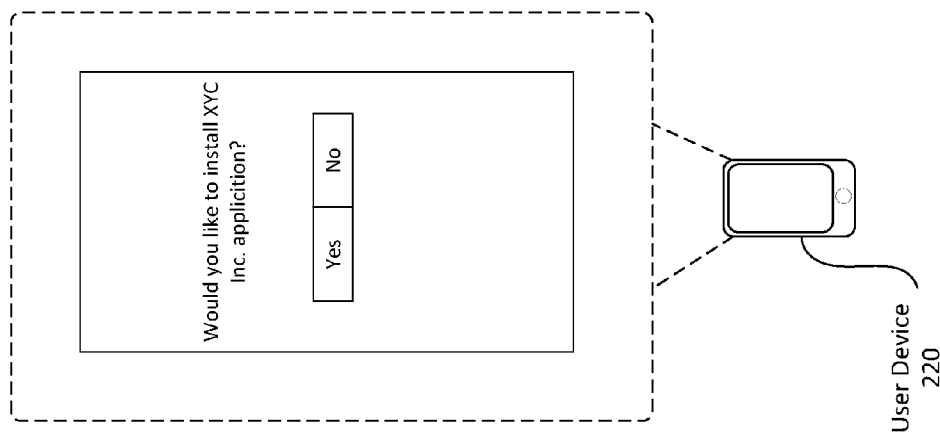
Figure 4B:
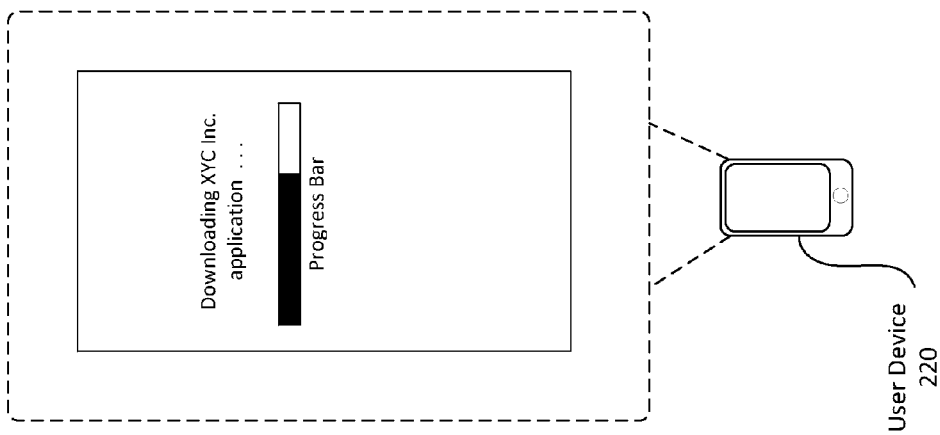

Referring now to FIG. 4B, instant access device 210 (shown in FIG. 2) may cause user device 220 to download a mobile application for XYZ Inc. in response to, for example, the user of user device 4B selecting "1" (from the keyboard of user device 220) to download and install the mobile application. In some implementations, instant access device 210 may verify that user device 220 has not already installed the mobile application prior to causing user device 220 to download and install the mobile application. Additionally, or alternatively, as shown in FIG. 4C, user device 220 may prompt the user of user device 220 to indicate whether user device 220 should install the mobile application. In other implementations, permission to install the mobile application may be assumed in response to the user selecting "1" to download and install the mobile application during the telephone call, thus eliminating the extra step of prompting the user for permission to install the mobile application.

Figure 4E:
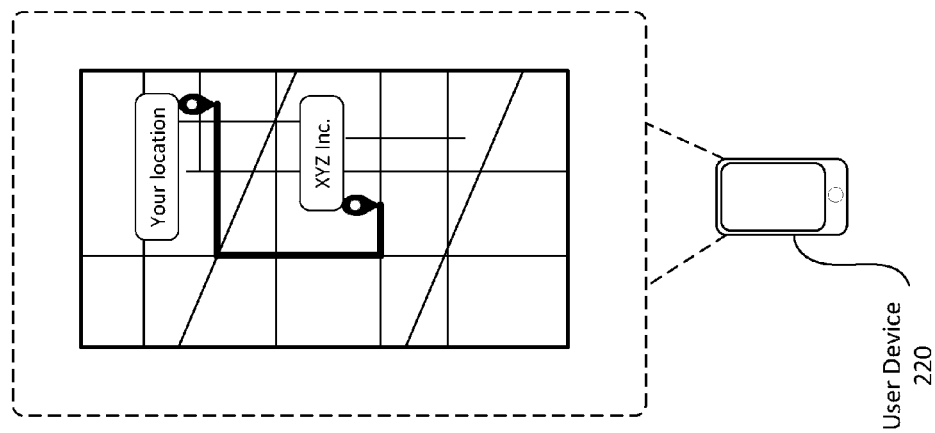
Figure 4D:
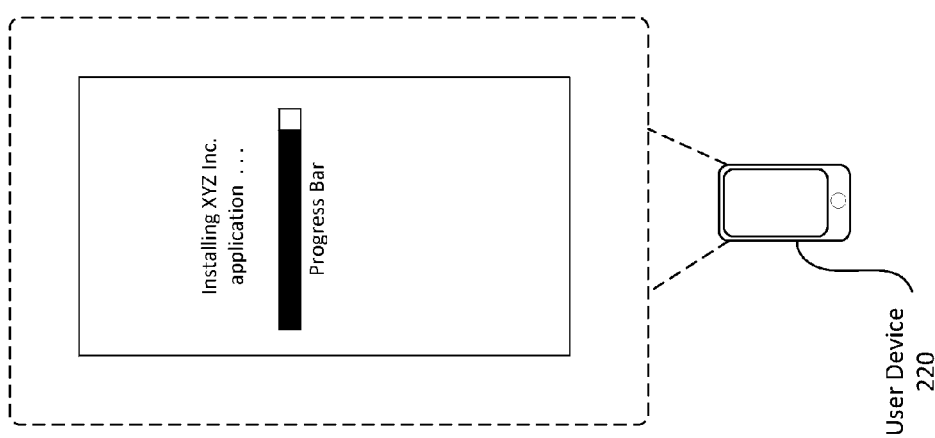

As shown in FIG. 4D, user device 220 may install the mobile application. Additionally, or alternatively, as shown in FIG. 4E, user device 220 may automatically launch the installed mobile application and display an application page corresponding to the service for which the user originally called instant access device 210 (e.g., location information corresponding to XYZ Inc.). In some implementations, the telephone call with instant access device 210 may end at one or more points described above with reference to FIGS. 4A-4E. For instance, the telephone call may end in response to the user of user device 220 indicating that he or she wants to download and install an application that would display directions to the nearest XYZ Inc. location. As another example, the telephone call may end after the mobile application is installed and the location information for XYZ Inc. is displayed.

Figure 5A:
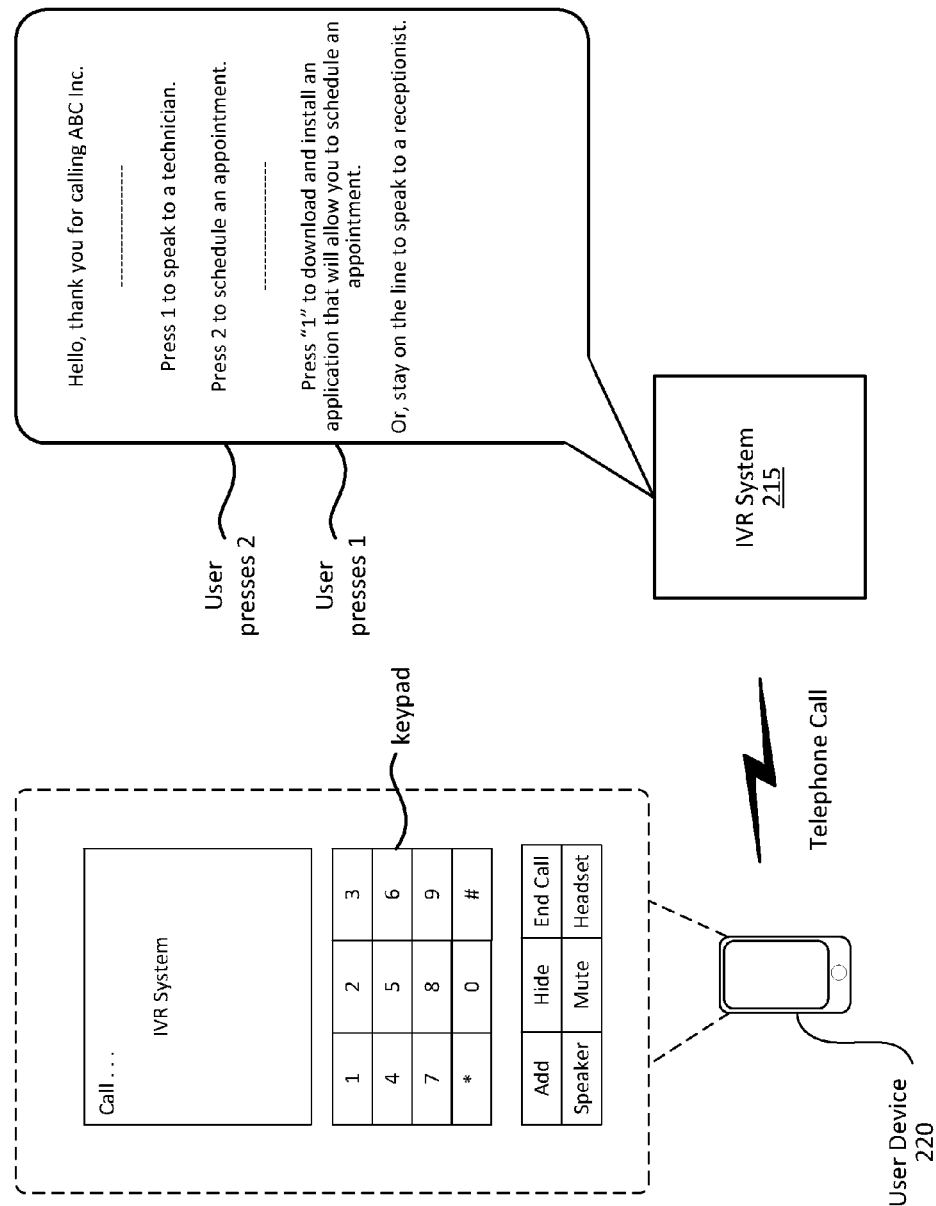
FIGS. 5A-5E illustrate an example implementation for instantly accessing a mobile application that requires authentication.

FIGS. 5A-5E illustrate an example implementation for instantly accessing a mobile application that requires authentication. As shown in FIG. 5A, user device 220 may engage in a telephone call with IVR system 215. IVR system 215 may provide a dialog to welcome the user of user device 220 to the telephone call (e.g., "Hello, thank you for calling ABC Inc."). Additionally, or alternatively, IVR system 215 may provide menu of options to user device 220, such as "Press 1 to speak to a technician," "Press 2 to schedule an appointment," etc. In the example shown in FIG. 5A, assume that the user of user device selects "2" to schedule an appointment with ABC Inc., and IVR system 215 responds by providing a menu of options for scheduling an appointment, such as "Press "1" to download and install an application that will allow you to schedule an appointment," "Stay on the line to speak to a receptionist," etc.

Figure 5C:
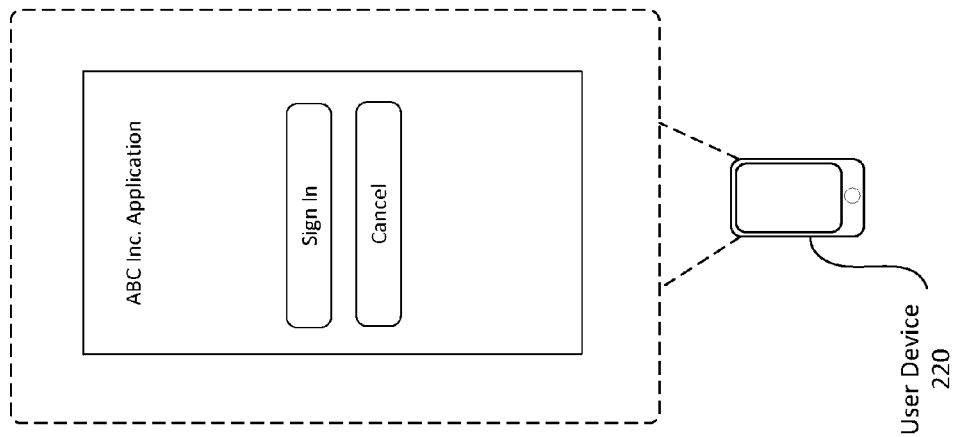
Figure 5B:
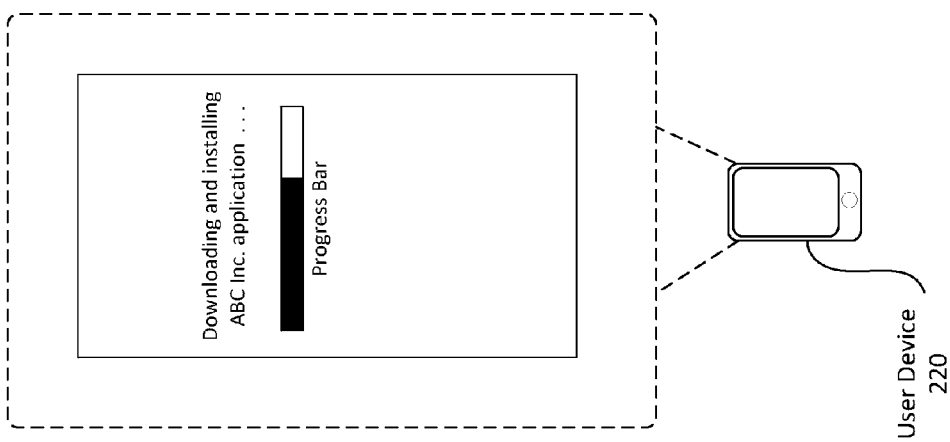

Referring to FIG. 5B, instant access device 210 (shown in FIG. 2) may cause user device 220 to automatically download and install a mobile application for ABC Inc., which may result from communications involving a server-side version of an instant access application operating on instant access device 210 and a client-side version of the instant access application operating on user device 220. User device 220 may provide a user with an option to sign in to the mobile application and/or an option to cancel or close the mobile application, as shown in FIG. 5C. However, in some implementations, user device 220 may access web services without having to indicate whether or not the user would like to sign in to the mobile application. For example, the user indicating that he or she would like to download and install the application (e.g., FIG. 5A) may be considered as an indication that the user would like to sign in to the mobile application, thereby further streamlining the processes of instantly accessing web services.

Figure 5E:
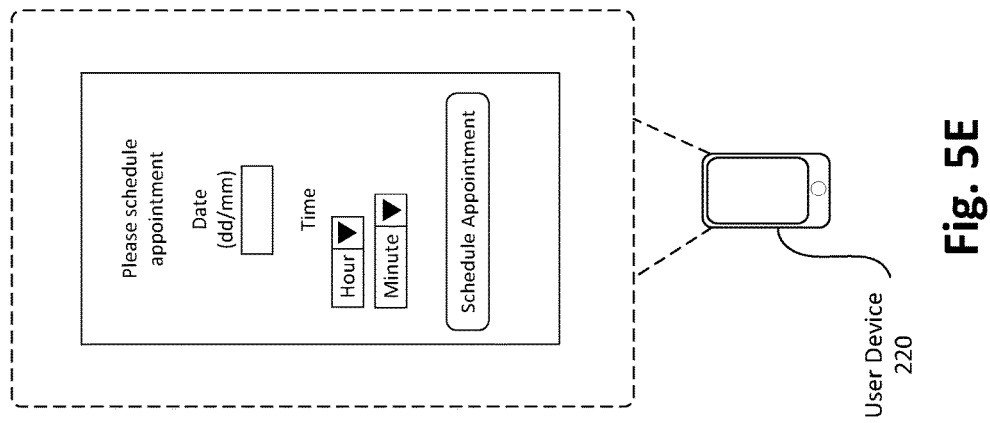
Figure 5D:
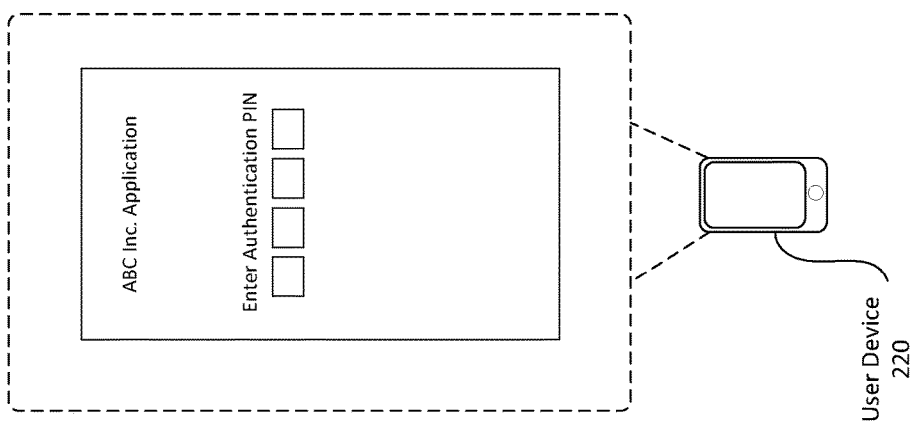

As shown in FIG. 5D, user device 220 may prompt a user to input authentication information. For example, user device 220 may request that the user input a four-digit code (e.g., a personal identification number (PIN)) to ensure the identity of the user requesting to access the mobile application. In some implementations, the authentication information (e.g., a four-digit code) may take the place of a user name and password that is typically required to access the mobile application, which may simplify the authentication process since a four-digit code may be easier for the user to remember than a user name and password. In such implementations, user device 220 may communicate the authentication information to instant access device 210, and instant access device 210 may use the authentication information to communicate with authentication system 230 and authenticate user device 220 for accessing the mobile application. In some implementations, a password or another type of identification/authentication information may be used instead of, or in addition to, a PIN.

In some implementations, user device 220 may eliminate the need for the user to enter authentication information. For instance, in some implementations, instant access device 210 may communicate with authentication system 230 and authenticate user device 220 based on a telephone number or another type of identifier associated with user device 220. In some implementations, authentication may involve a combination of authentication information (e.g., a four-digit code) from the user and an identifier (e.g., a telephone number) of user device 220). For example, instant access device 210 may locally authenticate the user of user device 220 based on the four-digit code provided by the user and may authenticate the user with authentication system 230 based on a telephone number of user device 220.

User device 220 may access the mobile application, as shown in FIG. 5E. For example, user device 220 may instantly access the mobile application and display a page within the mobile application that corresponds to the web service initially requested by user device 220. In the example depicted in FIG. 5E, user device 220 may open a page of the mobile application to access the web service of scheduling an appointment with ABC Inc.

Figure 6A:
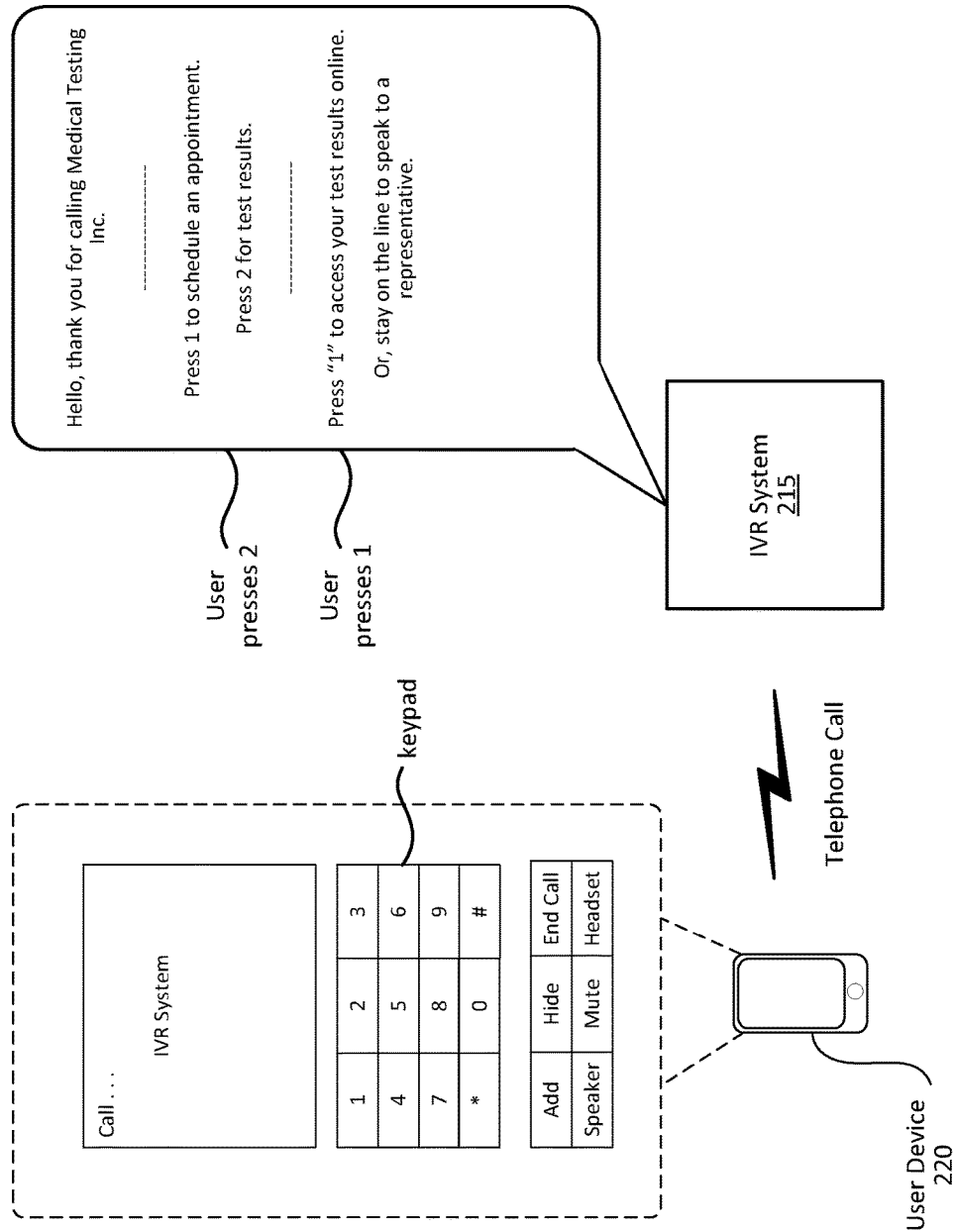
FIGS. 6A-6D illustrate an example implementation for instantly accessing a secured website with a user device from a telephone call.

FIGS. 6A-6D illustrate an example implementation for instantly accessing a secured website with user device 210. As shown in FIG. 6A, user device 220 may participate in a telephone call with IVR system 215. IVR system 215 may provide a dialog welcoming user device 220 to the telephone call (e.g., "Hello, thank you for calling Medical Testing Inc."). Additionally, or alternatively, server system 210 may provide menu of options to user device 220, such as "Press 1 to schedule an appointment," "Press 2 for test results," etc. In the example shown in FIG. 6A, assume that the user of user device selects "2" for test results from Medical Testing Inc., and IVR system 215 responds by providing a menu of options for accessing test results, such as "Press "1" to access your test results online," "Stay on the line to speak to a representative," etc.

Figure 6C:
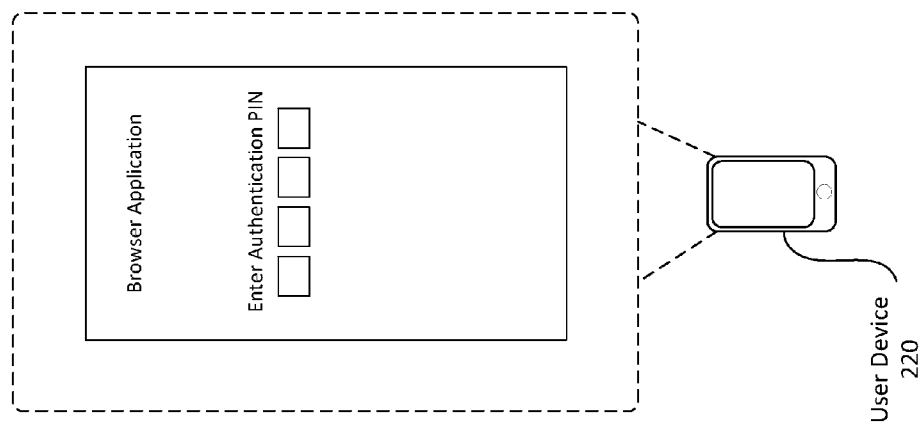
Figure 6B:
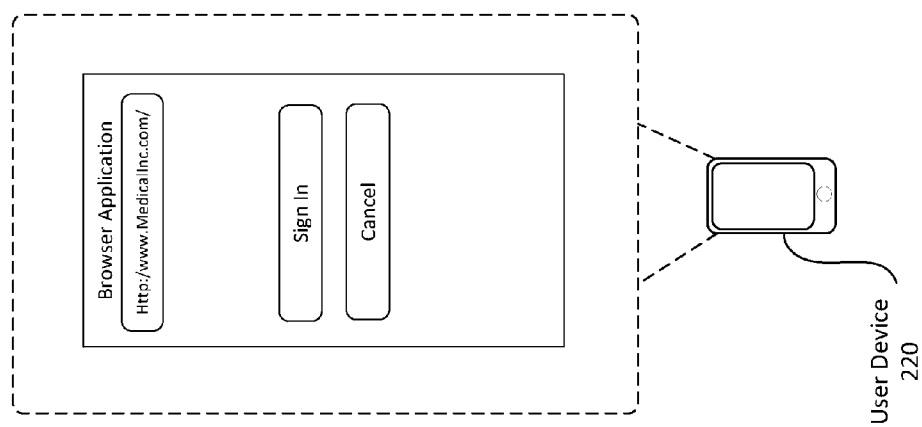

As shown in FIG. 6B, in response to the user selecting "2" for test results, instant access device 210 (shown in FIG. 2) may cause user device 220 to automatically open a browser application, access a website of Medical Testing Inc., and provide the user of user device 220 with an option to sign in to the website. In some implementations, user device 220 may access the website of Medical Testing Inc. without having to indicate whether or not the user would like to sign in to the website. For example, the user indicating that he or she would like to access test results online (e.g., in FIG. 6A) may be interpreted as a request by the user to sign in to the website of Medical Testing Inc., thereby further streamlining the processes of instantly accessing web services.

As shown in FIG. 6C, user device 220 may prompt a user to input authentication information. For example, user device 220 may request that the user input a four-digit code (e.g., a PIN) or another type of code sequence to ensure the identity of the user requesting to access the mobile application. In some implementations, the authentication information (e.g., a four-digit code) may take the place of a user name and password that is typically required to access the website of Medical Testing Inc., which may simplify the authentication process since a four-digit code may be easier for the user to remember than a user name and password. In such implementations, user device 220 may communicate the authentication information to instant access device 210, and instant access device 210 may use the authentication information to communicate with authentication system 230 and authenticate the user of user device 220 for accessing the website.

In some implementations, user device 220 may eliminate the need for the user to enter authentication information. For instance, in some implementations, instant access device 210 may communicate with authentication system 230 and authenticate user device 220 based on a telephone number or another type of identifier associated with user device 220. In some implementations, authentication may involve a combination of authentication information (e.g., a four-digit code) from the user and an identifier (e.g., a telephone number) of user device 220. For example, instant access device 210 may locally authenticate the user of user device 220 based on the four-digit code provided by the user instant access device 210 and may authenticate the user with authentication system 230 (for the website) based on a telephone number of user device 220.

Figure 6D:
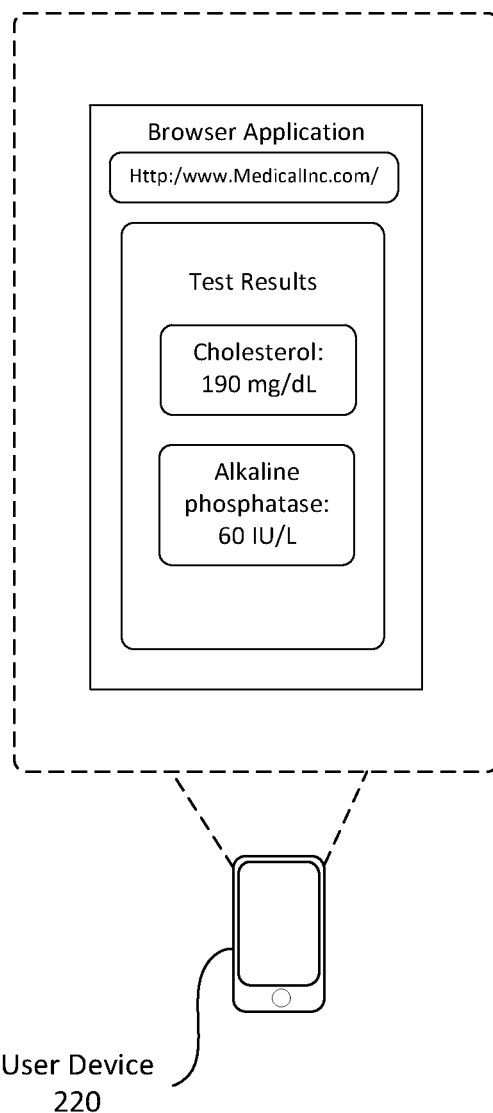

User device 220 may access the website of Medical Testing Inc., as shown in FIG. 6D. For example, user device 220 may instantly access the website of Medical Testing Inc. and display a webpage within the website of Medical Testing Inc. that corresponds to the medical test results of the user. While in the examples provided by FIGS. 6A-6D, instant access device 210 causes user device 220 to access the web service on a particular website, in other implementations, instant access device 210 may cause user device 220 to access an additional, or alternative, type of web service. For instance, instant access device 210 may cause user device 220 to access an image or a video, which may be available via a mobile application and/or a webpage. In such implementations, instant access device 210 may cause user device 220 to download a mobile application, install a mobile application, perform one or more authentication operations, and/or execute one or more other types of operations described herein.

Figure 7A:
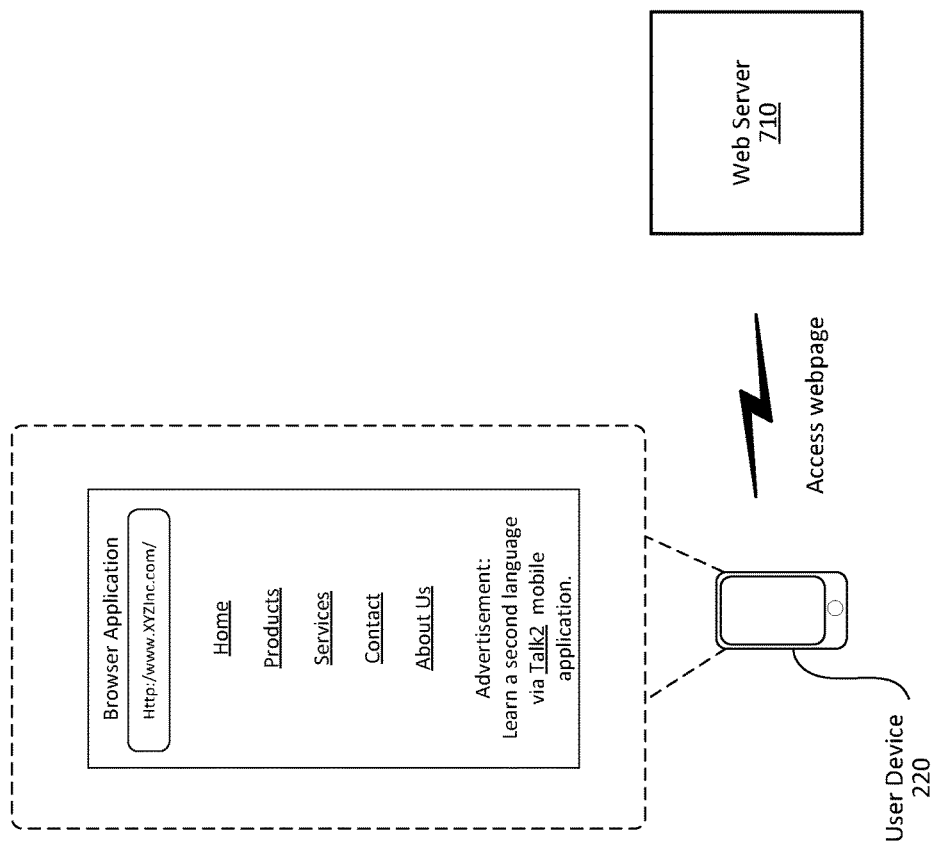
FIGS. 7A-7D illustrate an example implementation for instantly accessing a mobile application with a user device from a webpage.

FIGS. 7A-7D illustrate an example implementation for instantly accessing a mobile application with user device 220 from a webpage. As shown in FIG. 7A, user device 220 may communicate with web server 710 to access a webpage using a browser application installed on user device 220. The webpage may include one or more functional interface objects, such as one or more links to other webpages within a website (e.g., a Home link, a Products link, a Services link, a Contact link, an About Us link, etc.). The webpage may also, or alternatively, include an advertisement for a mobile application (e.g., Talk2).

Figure 7C:
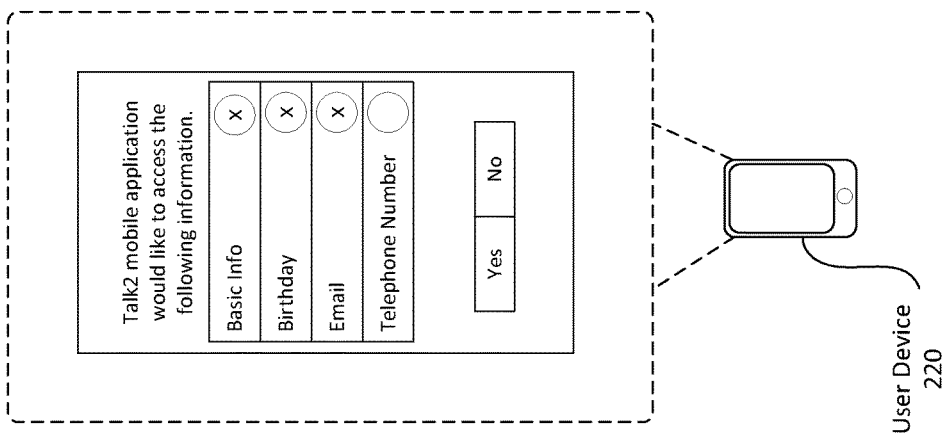
Figure 7B:
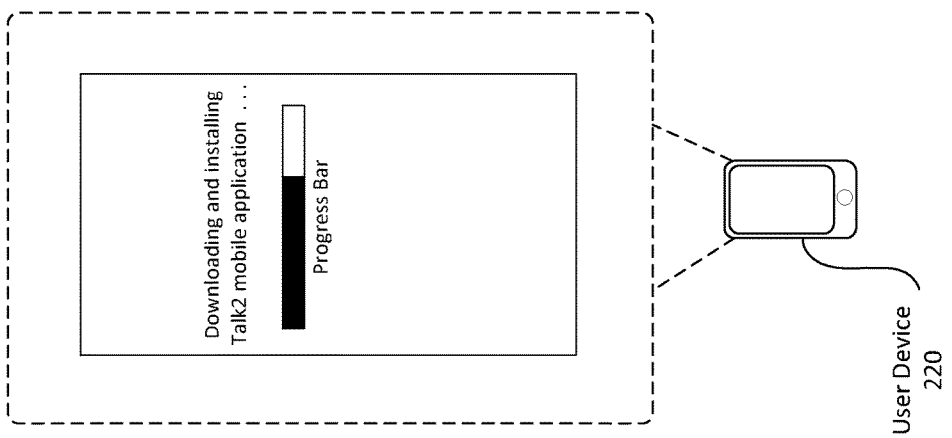
Figure 7D:
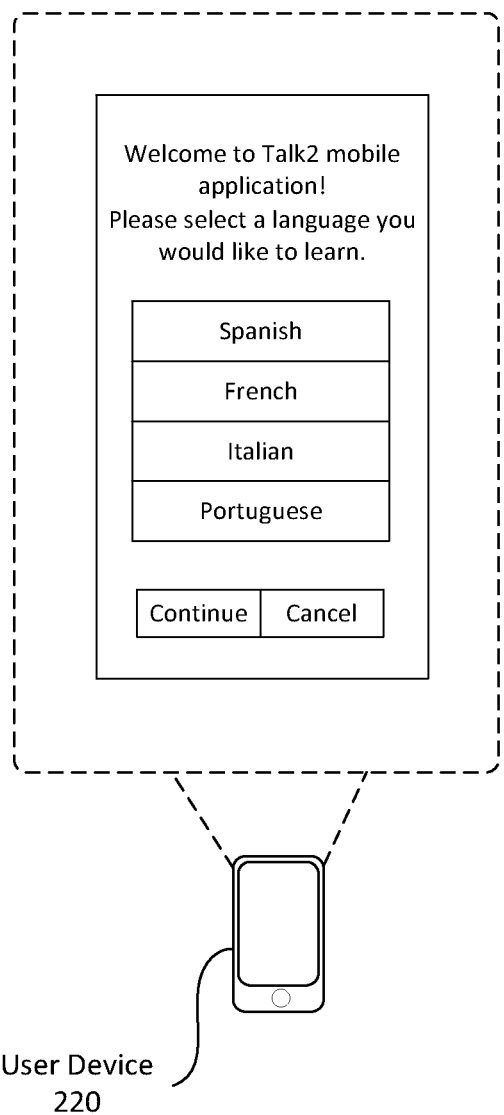

Referring now to FIG. 7B, in response to selecting the advertisement, instant access device 210 (shown in FIG. 2) may cause user device 220 to automatically download and install the mobile application associated with the advertisement. As shown in FIG. 7C, instant access device 210 and/or user device 220 may determine which types of information the newly installed mobile application would like to access for identification/authentication purposes. For instance, the newly installed application may need to access one or more types of basic information, such as a name of the user, a street address of the user, etc., a birthday of the user, an email address associated with the user, a telephone number associated with user device 220, and/or one or more other types of information. Additionally, or alternatively, user device 220 may display the information required and/or provide the user with the opportunity to give or withhold permission to the information (e.g., by selecting "Yes" or "No). Upon providing the requested information, user device 220 may be automatically logged in to the newly installed application, as shown in FIG. 7D. Accordingly, user device 220 may gain instant access to a mobile application that is advertised in a webpage displayed to a user.

FIG. 8 illustrates example pre-selected codes that may be used to instantly access a web services during a telephone call between IVR system 215 and user device 220. For example, a user may know that he or she would like to download and install a mobile application prior to IVR system 215 actually articulating the option for downloading and installing the mobile application. As such, the user of user device 220 may input a pre-selected code for downloading and installing the mobile application (e.g., "1234") prior to IVR system 215 actually articulating the option to do so. The pre-selected code may be recognized by IVR system 215 as a request to download and install the mobile application, and IVR system 215 may respond by ending the telephone call with user device 220 and communicating the request to instant access device 210. Instant access device 210 may cause mobile device 220 to download, install, and/or access the mobile application, as discussed above with respect to one or more of FIG. 3. In some implementations, the pre-selected codes may be made available to the user in one or more ways, such as being posted on a website of a telecommunications service provider or another organization, presented in an owner's manual accompanying the purchase of user device 220, stored as ROM in user device 220, etc.

In some implementations, the user may input the pre-selected code at any point during the telephone call. In other implementations, the user must input the pre-selected code at a particular point during the telephone call (e.g., during the first minute of the telephone call, during a time period instructed by instant access device 210, etc.) in order for the pre-selected code to be recognized. As depicted in FIG. 8, a pre-selected code may correspond to one or more of a variety of instructions in addition to downloading and installing a mobile application. For example, the user may input a pre-selected code to open a website (e.g., "2345"), which may cause instant access device 210 to send a link (or have a link sent by another device) associated with the website, to user device 220 via an SMS message. In another example, the user may input a pre-selected code to send an address for mapping (e.g., "3456") which may include an SMS message with a link or an instruction to download, install, and open a mobile application with mapping information as discussed above with respect to FIGS. 4A-4E.

In another example, the user may input a pre-selected code for an SMS response link (e.g., "4567") which may include an SMS message with a link or from a telephone number that the user may use to submit images, videos, and/or audio recordings to an organization via text message. In yet another example, the user may input a pre-selected code to send a location of the user to the customer service department of an organization (e.g., "5678"). For example, if the user is calling an organization for assistance with a flat tire, the user may input a pre-selected code to quickly transmit the current location of the user to the organization for assistance. In some implementations, the pre-selected codes and corresponding instructions may be coded into the server-side version of the instant access application and/or the client-side version of the instant access application, and as such, may be generally applicable to a variety of organizations without requiring specific context information.

Figure 9:
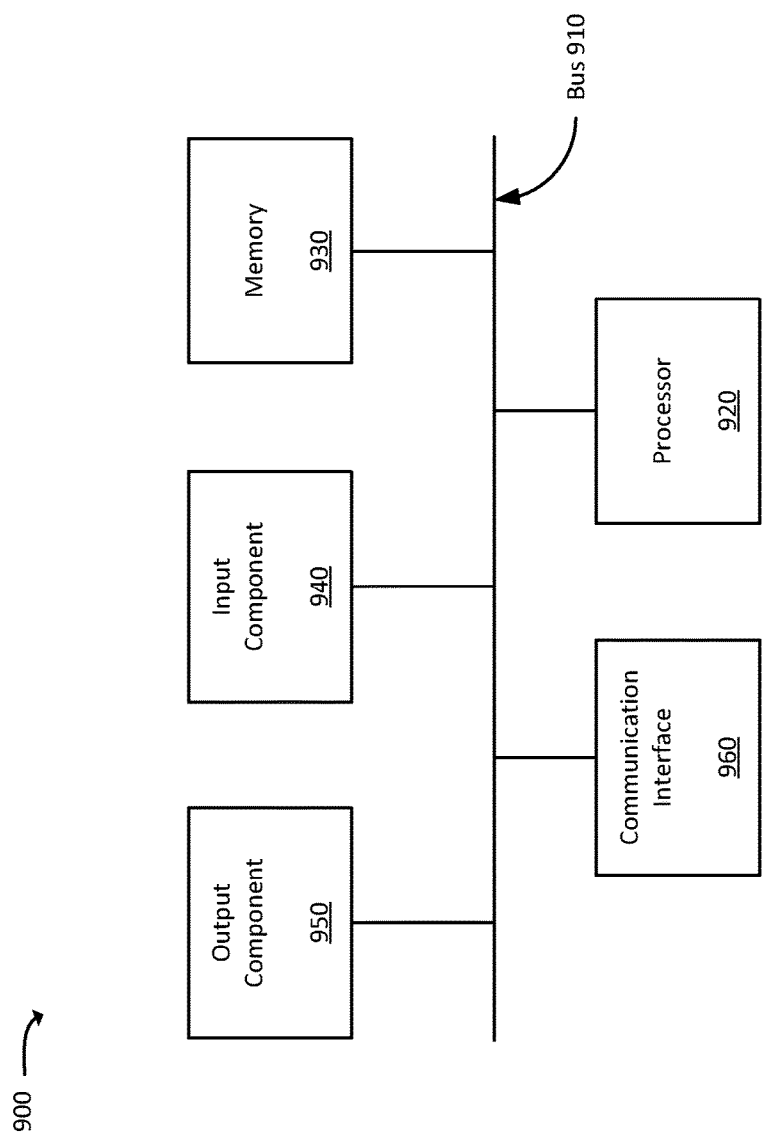
FIG. 9 illustrates example components of one or more devices, according to one or more implementations described herein.

FIG. 9 is a diagram of example components of device 900. One or more of the devices described above may include one or more devices 900. Device 900 may inciverlude bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes (LEDs), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations. For example, while a series of blocks has been described with regard to one or more figures described herein, the order of the blocks may be modified in other implementations. Further, non-dependent blocks may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown (e.g., in FIG. 2), in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method, comprising:
engaging, by one or more devices, in a telephone call with a user device;
presenting, by the one or more devices and during the telephone call, an interactive voice response ("IVR") menu that includes a plurality of IVR menu options, wherein a particular IVR menu option, of the plurality of IVR menu options, is an option to request installation of an application at the user device;
determining, by the one or more devices, a telephone number associated with the user device;
receiving, by the one or more devices and from the user device, during the telephone call, a selection of the particular IVR menu option to request installation of the application;
verifying, by the one or more devices, that the user device has not already installed the application;
communicating, by the one or more devices and to the user device, based on the verifying that the user device has not already installed the application, and based on receiving the selection to install the application, a first instruction, wherein receiving the first instruction causes the user device to automatically download and install the application;
authenticating, by the one or more devices, the user device based on the telephone number associated with the user device;
communicating, by the one or more devices and to an application server associated with the application, (a) the telephone number associated with the user device and (b) an indication that the user device has been authenticated,
wherein communicating the telephone number and the indication that the user device has been authenticated, to the application server, allows the application server to use the telephone number to identify user data associated with the user device, from a plurality of user data associated with a plurality of user devices, the user data associated with the user device having been generated prior to the telephone call; and
providing, by the one or more devices and to the user device, a second instruction, wherein receiving the second instruction causes the user device to use the installed application to communicate with the application server, wherein the application server provides at least some of the identified user data, associated with the user device, to the user device via the installed application.

2. The method of claim 1, wherein authenticating the user device includes:
authenticating the user device prior to communicating the telephone number to the application server.

3. The method of claim 1, further comprising:
terminating the telephone call in response to receiving the selection of the particular IVR menu option from the user device.

4. The method of claim 1, wherein the IVR menu options include one or more audible menu options.

5. The method of claim 1, further comprising:
providing a prompt to the user device for authorization to install the application; and
receiving the authorization to install the application from the user device prior to communicating the first instruction to install the application.

6. The method of claim 1, further comprising:
receiving authorization from the user device to access user information stored by the user device,
wherein authorizing the device further includes using the user information to authorize the user device.

7. The method of claim 1, wherein the first instruction, to automatically download and install the application, comprises a web address for downloading the application from the application server associated with the application.

8. The method of claim 1, wherein the second instruction comprises a web address that the user device uses to communicate with the application server.

9. The method of claim 1, further comprising:
receiving authentication information from the user device in response to the user device presenting a prompt to enter the authentication information,
wherein authorizing the device further includes using the authentication information to authorize the user device.

10. A system, comprising:
a non-transitory memory device storing a plurality of processor-executable instructions; and
a processor configured to execute the processor-executable instructions, wherein executing the processor-executable instructions causes the system to:
determine a telephone number of a user device that is engaged in a call;
present, during the telephone call, an interactive voice response ("IVR") menu that includes a plurality of IVR menu options,
wherein a particular IVR menu option, of the plurality of IVR menu options, is an option to request installation of an application at the user device;
receive, during the call, a selection of the particular IVR menu option to request installation of the application;
verify that the user device has not already installed the application in response to receiving the request for the web service;
communicate, to the user device, based on the verifying that the user device has not already installed the application, and based on receiving the selection to install the application, instructions that cause the user device to automatically download and install the application;
communicate, to an application server associated with the application, the telephone number of the user device and an indication that the user device has been authenticated,
wherein communicating the telephone number and the indication that the user device has been authenticated, to the application server, allows the application server use the telephone number to identify user data associated with the user device, from a plurality of user data associated with a plurality of user devices, the user data associated with the user device having been generated prior to the telephone call; and provide, to the user device, instructions that cause the user device to automatically use the installed application to communicate with the application server, wherein the application server provides at least some of the identified user data, associated with the user device, to the user device via the installed application.

11. The system of claim 10, wherein executing the processor-executable instructions further cause the one or more processors to:

terminate the telephone call in response to receiving the selection of the particular IVR menu option from the user device.

12. The system of claim 10, wherein the instructions, to automatically download and install the application, comprise a web address for downloading the application from the application server associated with the application.

13. The system of claim 10, wherein the request comprises a pre-selected code associated with downloading and installing the application.

14. The system of claim 10, wherein the IVR menu options include one or more audible menu options.

15. A non-transitory computer-readable medium storing processor-executable instructions, which, when executed by one or more processors associated with a server device, cause the server device to:

engage in a telephone call with a user device;

present, during the telephone call, an interactive voice response ("IVR") menu that includes a plurality of IVR menu options, wherein a particular IVR menu option, of the plurality of IVR menu options, is an option to request installation of an application at the user device;

determine a telephone number associated with the user device;

receive, during the telephone call and from the user device, a selection of the particular IVR menu option to request installation of the application;

verify that the user device has not already installed the application;

communicate, to the user device and based on the verifying that the user device has not already installed the application, instructions that cause the user device to automatically download and install the application;

communicate, to an application server associated with the application, the telephone number associated with the user device and an indication that the user device has been authenticated, wherein communicating the telephone number and the indication that the user device has been authenticated, to the application server, allows the application server to use the telephone number to identify user data associated with the user device, from a plurality of user data associated with a plurality of user devices, the user data associated with the user device having been generated prior to the telephone call;

and provide, to the user device, instructions that cause the user device to automatically use the installed application to communicate with the application server, wherein the application server provides at least some of the identified user data, associated with the user device, to the user device via the installed application.

16. The non-transitory computer-readable medium of claim 15, wherein processor-executable instructions further include processor-executable instructions to terminate the telephone call in response to receiving the selection of the particular IVR menu option from the user device.

17. The non-transitory computer-readable medium of claim 15, wherein the request comprises a pre-selected code associated with downloading and installing the application.

18. The non-transitory computer-readable medium of claim 15, wherein the instructions, wherein the instructions, to automatically download and install the application, comprise a web address for downloading the application from the application server associated with the application.

19. The non-transitory computer-readable medium of claim 15, wherein the IVR menu options include one or more audible menu options.

20. The non-transitory computer-readable medium of claim 15, wherein the processor-executable instructions further include processor-executable instructions to:

provide a prompt to the user device for authorization to install the application; and receive the authorization to install the application from the user device prior to communicating the first instruction to install the application.

* * * * *